US005566012A

United States Patent [19]
Koshimizu et al.

[11] Patent Number: 5,566,012
[45] Date of Patent: Oct. 15, 1996

[54] OPTICALLY ADDRESSED LIQUID CRYSTAL DISPLAYING AND RECORDING DEVICE

[75] Inventors: Minoru Koshimizu; Takeo Kakinuma; Kensuke Ito, all of Ebina, Japan

[73] Assignee: Fuji Xerox Co., Ltd., Tokyo, Japan

[21] Appl. No.: 325,599

[22] Filed: Oct. 19, 1994

[30] Foreign Application Priority Data

Jan. 4, 1994 [JP] Japan .................................. 6-000029

[51] Int. Cl.$^6$ ........................... G02F 1/135; G02F 1/1333
[52] U.S. Cl. ................................. 359/72; 359/51
[58] Field of Search .................................. 359/72, 55, 86, 359/51, 56

[56] References Cited

U.S. PATENT DOCUMENTS

| | | | |
|---|---|---|---|
| 4,435,047 | 3/1984 | Fergason | 350/334 |
| 4,634,225 | 1/1987 | Haim et al. | 359/86 |
| 4,746,197 | 5/1988 | Endo et al. | 359/55 |
| 4,906,984 | 3/1990 | Takeda et al. | 340/765 |
| 5,088,806 | 2/1992 | McCartney et al. | 359/86 |
| 5,184,118 | 2/1993 | Yamazaki | 359/55 |
| 5,270,697 | 12/1993 | Takeda | 345/96 |
| 5,398,043 | 3/1995 | Takeda et al. | 345/94 |
| 5,486,936 | 1/1996 | Fujikake et al. | 359/51 |

FOREIGN PATENT DOCUMENTS

| | | |
|---|---|---|
| 58-501631 | 9/1983 | Japan . |
| 63-155022 | 6/1988 | Japan . |
| 63-501512 | 6/1988 | Japan . |
| 3-5729 | 1/1991 | Japan . |
| 3-155525 | 7/1991 | Japan . |
| 4-53928 | 2/1992 | Japan . |
| 4-94281 | 3/1992 | Japan . |
| 4-130420 | 5/1992 | Japan . |
| 4-218021 | 8/1992 | Japan . |

Primary Examiner—William L. Sikes
Assistant Examiner—Charles Miller
Attorney, Agent, or Firm—Oliff & Berridge

[57] ABSTRACT

An optically addressing liquid crystal displaying and recording device is capable of obtaining good images free of non-uniformity of density without impairing the characteristics of a light modulating layer. The device includes a light modulating layer 1 including liquid crystals, a photoconductive layer 2 laminated on one side of the light modulating layer 1 and a voltage controlling device 3 for controlling the polarity of the voltage applied to the light modulating layer 1 and the photoconductive layer 2. The device further includes an exposing device 4 for repeatedly scanning a beam on the photoconductive layer 2, a detecting device 5 for detecting scanning of a beam and a controlling device 3 for controlling a timing when the voltage is applied in accordance with a detecting signal outputted by the detecting device 5. The polarity of the voltage applied to each pixel of the laminate of the photoconductive layer and the light modulating layer is controlled by the voltage controlling device 3 to be opposite with respect to that of the voltage applied to the same pixel during previous scanning based on the detecting signals produced and sent by the detecting device 5.

7 Claims, 6 Drawing Sheets

OPTICALLY ADDRESSED LIQUID CRYSTAL DISPLAYING AND RECORDING DEVICE

FIELD OF THE INVENTION

The present invention relates to an optically addressed liquid crystal displaying and recording (storing) device, and especially to a rewritable medium and an optically addressed liquid crystal displaying and recording device using liquid crystals, which is applied in a recording device using the rewritable medium, an image display device, an image memory device or the like.

BACKGROUND OF THE INVENTION

A display device wherein an optical conductive layer and a light modulating layer are laminated, whose optical conductive layer is exposed in accordance with image information while electric field is applied thoroughly and in whose light modulating layer images are written by controlling orientation of liquid crystals in the light modulating layer is practically used as a liquid crystal light valve or the like, as detailed processing is not necessary with it and images of high resolution can be written in it at high speed.

Conventionally, as such devices, those described in Japanese unexamined patent publication No. Hei 4-94281, Japanese unexamined patent publication No. Hei 4-130420 and Japanese unexamined patent publication No. Hei 4-218021 are known. In these publications, it is shown that laser beam is used for a light source used for optical addressing and that the purpose of these inventions are to obtain images of high resolution at low manufacturing cost (as described in Japanese unexamined patent publication Hei 4-94281) and to carry out local rewriting by controlling synchronously exposure and applying pulse of voltage of opposite polarities (as described in Japanese unexamined patent publication No. Hei 4-218021) or the like, and structures and driving methods to realize these purposes are proposed. Further, in Japanese unexamined patent publications No. Hei 3-5729 and Hei 4-53928, cases are described where amorphous silicon is used for photoconductive layer and images are written in a light modulating layer (liquid crystal layer) by scanning a laser beam. In these publications, provision of a new diode layer or a Schottky layer for the purpose of preventing applying DC voltage component, which is caused by the rectifying characteristics of Schottky structure caused by contacting the photoconductive layer and an electrode, to the light modulating layer.

On the other hand, demands for electronic devices whose displays are clear or which are easy to treat are increasing recently so that users can use devices more comfortably. Of these devices, as electronic displays are often used for operations mainly including making and displaying documents, the realization of the one capable of photosensitive displaying which does not tire human eyes, of high speed displaying, and of having high reflection contrast and memory characteristics with respect to the contents of display is desired. Display technique items which satisfy a part of these requests have been proposed, and of them, displaying using light scattering mode of liquid crystals is known.

A display of light scattering mode is made by combining liquid crystals and transparent materials whose index of refraction becomes equal to that of the liquid crystals when the orientation of the liquid crystals is perpendicular to an electrode, and it uses the characteristics of this combination wherein light is transmitted when the orientation of the liquid crystals is perpendicular to the electrode and light is scattered and not transmitted when the orientation of the liquid crystals is random because of the difference of the indexes of refraction. As this display is reflective, it does not tire human eyes, and further, as a polorizer is not necessary with this display, the amount of transmitted light is high and high reflection contrast can be obtained.

As a method for making a material used for such a display of light scattering mode, the one wherein capsulized liquid crystals are dispersed in polymer as drops of liquid crystals and the mixture is filmed is known (as described in Japanese unexamined patent publication 58-501631, which corresponds to U.S. Pat. No. 4,435,047) Here, the liquid crystals in Nematic Curvilinear Aligned Phase (NCAP) are in nematic phase showing positive dielectric anisotropy at ambient temperature, and if electric field is applied to them, the orientation of the liquid crystals is toward the electric field, and the index of refraction $n_0$ of the liquid crystals and that of the polymer $n_p$ become equal, which makes the film transparent. If the electric field is removed, the orientation of liquid crystals becomes random, light is scattered at the borders between the liquid crystals and polymer in the film and not transmitted, and the film becomes opaque, which makes information displayed. Japanese unexamined patent publications No. Sho 63-501512 and No. Sho 63-155022 disclose the use of liquid crystals which are in smectic phase at ambient temperature, which adds to the layer memory characteristic with respect to light modulation. If these materials are used, as it is possible to store written images without a power supply by the memory characteristics of liquid crystals and to film recording and displaying medium, a screen can be treated as a hard copy.

With the structure of the above described light modulating layer wherein liquid crystals are dispersed in polymer and on which photoconductive layer is laminated, images of high contrast and high resolution can be obtained with low energy and at high speed. The medium wherein information is stored disclosed in Japanese unexamined patent publication Hei 3-155525, which is an example of conventional arts, comprises a light modulating layer of high resin having liquid crystals dispersed therein and a photoconductive layer comprising amorphous silicon, and with it, optical images are focused on the photoconductive layer and intensity of electric field which depends on the exposure pattern to each portion of the photoconductive layer is provided to the light modulating layer. As the source of light used for addressing to this light modulating layer on which the photoconductive layer is laminated, may be used a combination of laser light source which emits in accordance with image signals in time series and some optical scanning devices, in addition to an emitting device made by applying CRT to it or the like. With a combination of laser light source which emits in accordance with image signals in time series and some optical scanning devices, it is possible to realize easy outputting of electronic image information, and more general usage can be expected.

With such devices, however, if images are written by applying AC electric field while scanning a beam, non-uniformity of density occurs in written images, because of the waveform of applied electric field, and irregularity of timing when exposing and applying the electric field are carried out.

The cause of non-uniformity of density is now described, referring to an example. Conventionally, in many cases, in order to control the transmissivity of a light modulating layer comprising liquid crystals dispersed in high polymer, resin AC electric filed is applied for the purpose of preventing deterioration, which is caused by DC component, or the like of the light modulating layer. When using a film of high polymer resin having liquid crystals dispersed therein, if a voltage is applied, the liquid crystals in the high polymer resin are oriented and the difference of indexes of refraction at the borders between the liquid crystals and the high polymer resin become small enough to be disregarded, which makes the film transparent. If electric field is not applied, high polymer resin and liquid crystals are in optically anisolotropic state and becomes light-scattered. Here, if the intensity of electric field is different portion by portion, the orientation of liquid crystals is also different portion by portion in accordance with the state of the portions, which causes non-uniformity of density of images. Further, if the polarity of applied voltage is the same continuously, DC component occurs, which causes resolution or the like of the material of the liquid crystals and deterioration of characteristics of the liquid crystals. When scanning a beam on the photoconductive layer by means of laser beam or the like is repeated while applying AC electric field to the light modulating layer on which the photoconductive layer is laminated, the voltage applied to a pixel (hereinafter in this specification, pixel corresponds to the portion to be exposed) does not comprise waveforms having continuously same effective values but of short waveforms corresponding to short exposure time.

Therefore, as a conventional example whose schematic structure is shown in FIG. 2, when a beam is scanned by exposing means 4 to a medium wherein information is stored and which comprises light modulating layer 1 including of high polymer having liquid crystals dispersed therein and optical conductive layer 2, if writing of images is carried out without controlling the polarity of voltage applied from AC power supply 31 or waveform, effective values or polarity of pulse of voltage repeatedly applied to the same pixels may be different each time. No attempt are tried in the above described conventional arts to overcome the non-uniformity of density caused by the combination of scanning exposure and applying of AC electric field and the deterioration of light modulating layer caused by applying DC component.

SUMMARY OF THE INVENTION

It is an object of the present invention to provide an optically addressed liquid crystal displaying and recording device free of the defects found in the conventional art.

It is another object of the present invention to provide a liquid crystal displaying and recording medium with which it is possible to obtain good images free of nonuniformity of density, without impairing the characteristics of light modulating layer.

Additional objects and advantages of the invention will be set forth in part in the description which follows and in part will be apparent from the description, or may be learned by practice of the invention.

An optically addressed liquid crystal displaying and recording device according to the present invention and to realize the above described objects comprises:

a displaying and recording medium at least comprising a light modulating layer including liquid crystals and an optical conductive layer provided on one side of the light modulating layer;

voltage applying means for applying voltage of a predetermined polarity to the two layers of the displaying and recording medium;

voltage controlling means for controlling the polarity of voltage applied by the voltage applying means;

exposing means for carrying out scanning exposure to the optical conductive layer;

detecting means for detecting timing of scanning exposure; and controlling means for controlling the timing when voltage is applied by the voltage applying means in accordance with detecting signals produced and sent by the detecting means, and the voltage controlling means is characterized by controlling the voltage applying means, when scanning exposure is applied to predetermined portions of the displaying and recording medium by the exposing means, so that the polarity of voltage applied to the predetermined portions by the voltage applying means becomes opposite with respect to that of the voltage applied to the predetermined portion a previous time, which is immediately before the time in question.

For the liquid crystal displaying and recording medium according to the present invention, it is desirable that the waveform of voltage applied by the voltage applying means is rectangular, and a combination of a laser beam source and a scanning device capable of scanning the beam at least in a direction may be used.

Further, it is desirable to carry out inversion of the polarity of applied voltage in a portion other than images, of the portions to which scanning exposure is applied.

It is desirable to use, as a light modulating layer, a film wherein liquid crystals are dispersed in high polymer since a good reflection contrast is obtained, and materials for this layer are not restricted to it. If nematic liquid crystals are used for a light modulating layer, phase transition mode, twist nematic mode, birefringence mode induced by electric filed, guest-host mode, and light-scattering layer can be used. If smectic liquid crystals are used, birefringence mode, guest-host mode, light-scattering layer, and further, ferroelectric liquid crystals can be used.

If the light modulating layer is made by dispersing in high polymer liquid crystals which are in smectic A phase at ambient temperature and transferred into nematic phase when the temperature is higher than ambient temperature, as it has good memory characteristics for images, it is desirable. Here, it is further desirable that liquid crystals and high polymer are connected three-dimensionally and that the liquid crystals are dispersed in high polymer uniformly to obtain high light-scattering and low drive voltage.

It is also desirable that the optically addressed liquid crystal displaying and recording device according to the present invention comprises heating means for heating the light modulating layer to a plurality of levels which are higher than ambient temperature. Moreover, it is desirable that this heating means can determine heating timing by means of liquid crystal phase detecting means for detecting the phases of the liquid crystals and that the optical conductive layer is made of amorphous silicon hydride.

As voltage applying means, inorganic transparent electrodes such as ITO (indium tin oxide) or $SnO_2$ formed on transparent substrates of inorganic transparent solids such as non-alkalic glass or of organic transparent solids or the like such as PES (polyethersulfone), PET (polyethyleneterephthalate), polystylene and polyimide, or organic transparent electrodes such as ion-doped polyacetylene, which hold the light modulating layer and the optical conductive layer, can be connected to the power supply.

As exposing means, the present invention is not restricted to the above described scanning using layer beam, and self-emitting image bars such as an LED array, a vacuum fluorescent type array, a plasma display array or an edge emitting EL array or optical shutter type one-dimensional image bars such as a liquid crystal shutter array, a PLZT shutter array can be used two-dimensionally.

The operation of the optically addressed liquid crystal displaying and recording device according to the present invention is now described, referring to FIG. 1. Exposure to optical conductive layer 2 and light modulating layer 1, the whole surfaces of which is light-scattered, in accordance with image information is repeatedly carried out from the side of optical conductive layer 2 by exposing means 4 while applying AC voltage by voltage controlling means 3 from outside. As the portion of optical conductive layer 2 to which exposure is carried out becomes conductive, almost all the applied voltage is conducted to light modulating layer 1 and the liquid crystals of the portions exposed through optical conductive layer 2 are oriented toward the electric field, and the portion becomes transparent, while the portion to which electric field is not applied becomes light-scattered. The electric field is applied being synchronized with start timing of scanning exposure for the images of a sheet of paper detected by detecting means 5 and the polarity of applied voltage is inverted in accordance with end timing of scanning exposure for the images of a sheet of paper or end timing of scanning exposure for a line, and the inversion is carried out in a portion other than images, of the portions to which scanning exposure is applied. As the waveform of the applied voltage is rectangular, the effective values of the voltage applied for writing images of a sheet of paper is the same regardless of the portion of a laminate of the optical conductive layer and the light modulating layer. Further, even though scanning exposure by the scanning means is repeated, the polarity of the voltage applied with respect to the same pixel of the laminate is inverted for each scanning, deterioration of liquid crystals is reduced and images free of non-uniformity of density are obtained.

If liquid crystals which are in smectic A phase at ambient temperature and transferred into nematic phase when the temperature is higher than ambient temperature and which are dispersed in high polymer are used for light modulating layer 1, in order to make the light modulating layer light-scattered, liquid crystals are once heated to the temperature higher than the transition point to isotropic phase by heating means 6 and they are cooled to ambient temperature. In order to write images, liquid crystals are heated again by heating means to the temperature higher than the transition point to nematic phase, and while detecting by liquid crystal phase detecting means the phases of the liquid crystals then being cooled, voltage is applied to light modulating layer 1 and optical conductive layer 2 by voltage controlling means 3, and exposure to optical conductive layer 2 is carried out by exposing means 4. If rewriting of images is not carried out, the light modulating layer displaying images is cooled to smectic A phase, and images are kept held even if electric filed is not applied.

DETAILED DESCRIPTION OF THE INVENTION

Embodiment 1

The optically addressed liquid crystal displaying and recording device according to the present invention is now described in detail, referring to embodiments.

Figure 1:
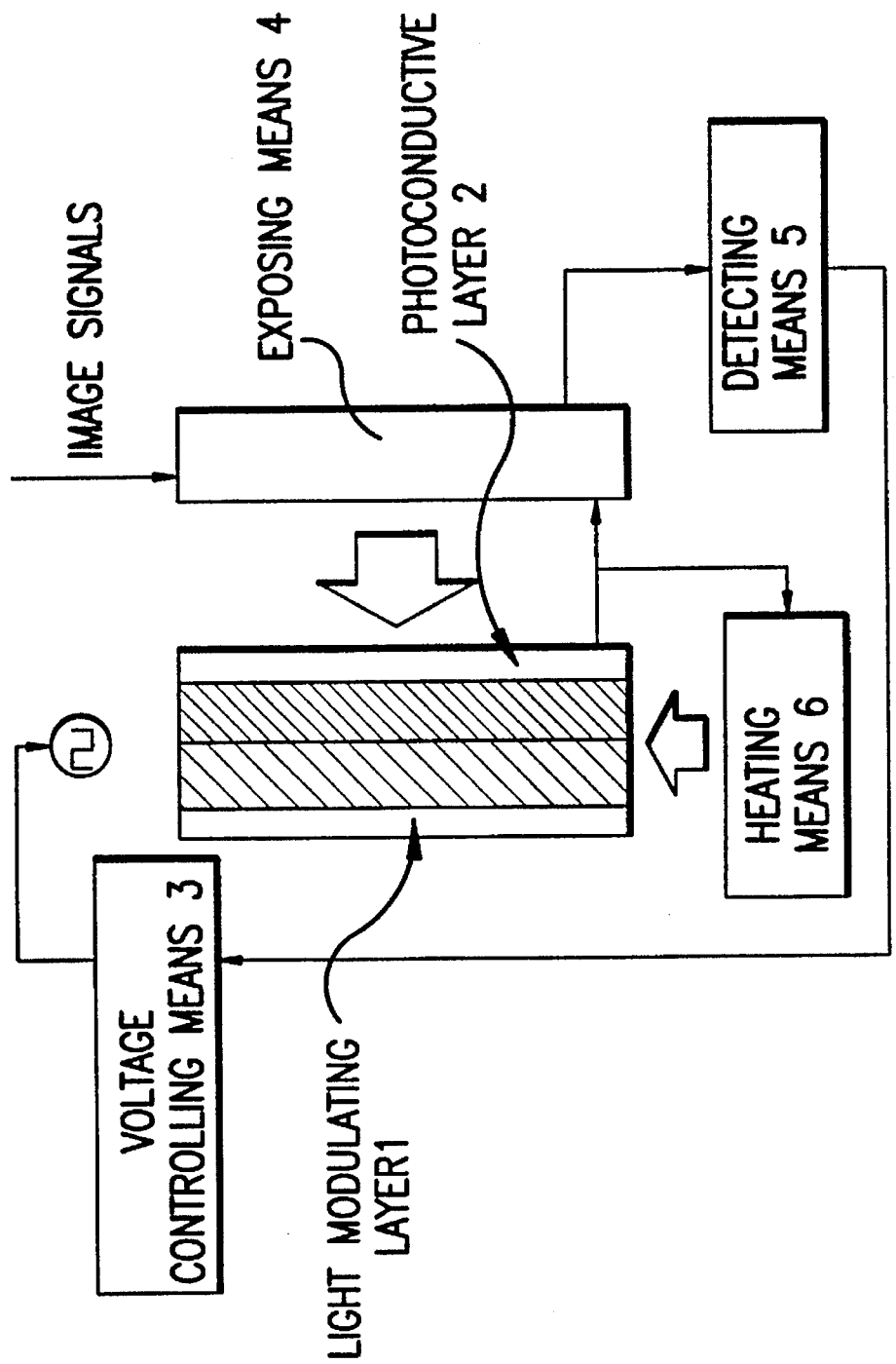
FIG. 1 shows the structure and operation of an optically addressed liquid crystal displaying and recording device according to the present invention.
Figure 2:
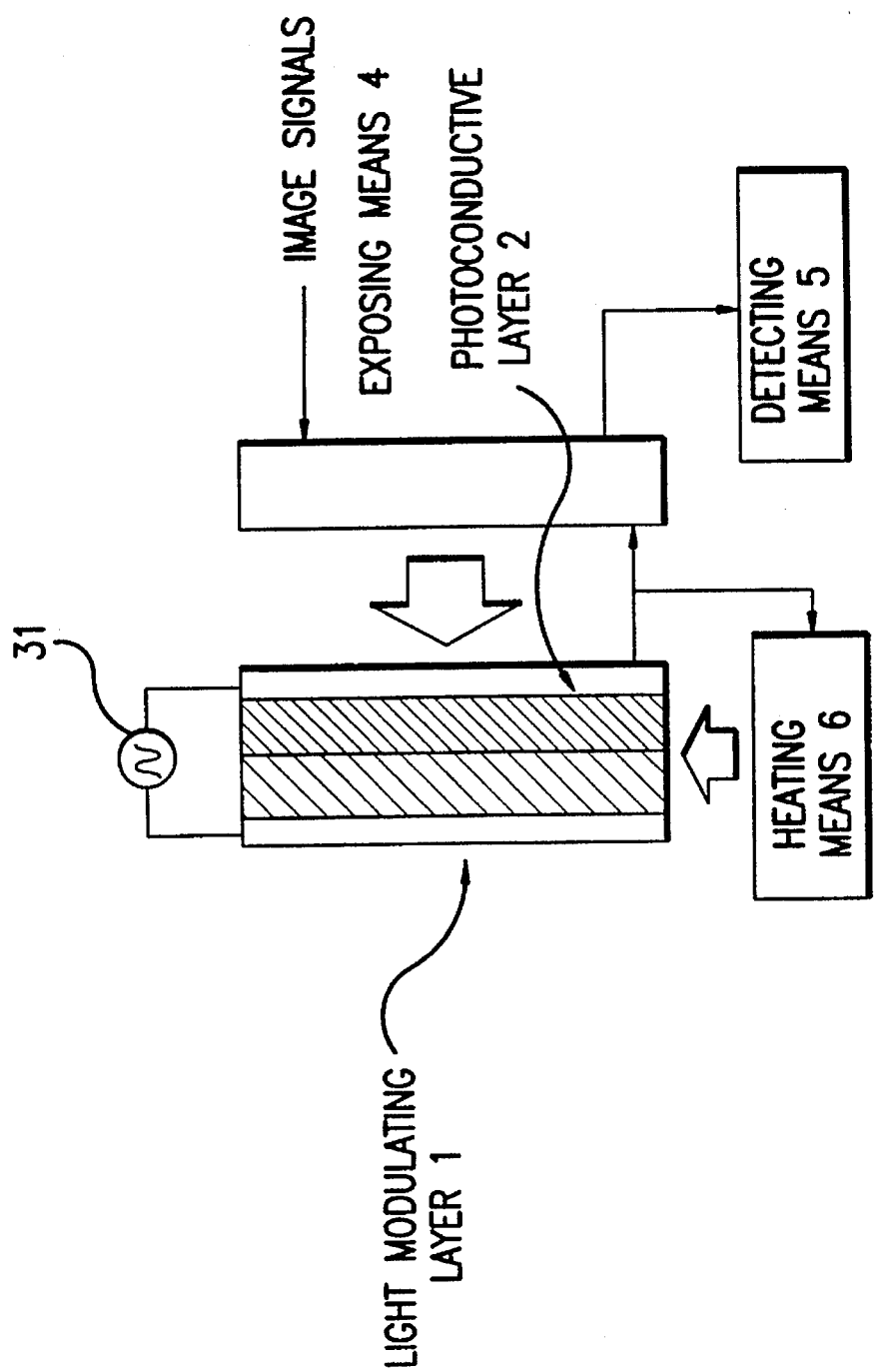
FIG. 2 shows the structure and operation of a conventional optically addressed liquid crystal displaying and recording device.
Figure 3:
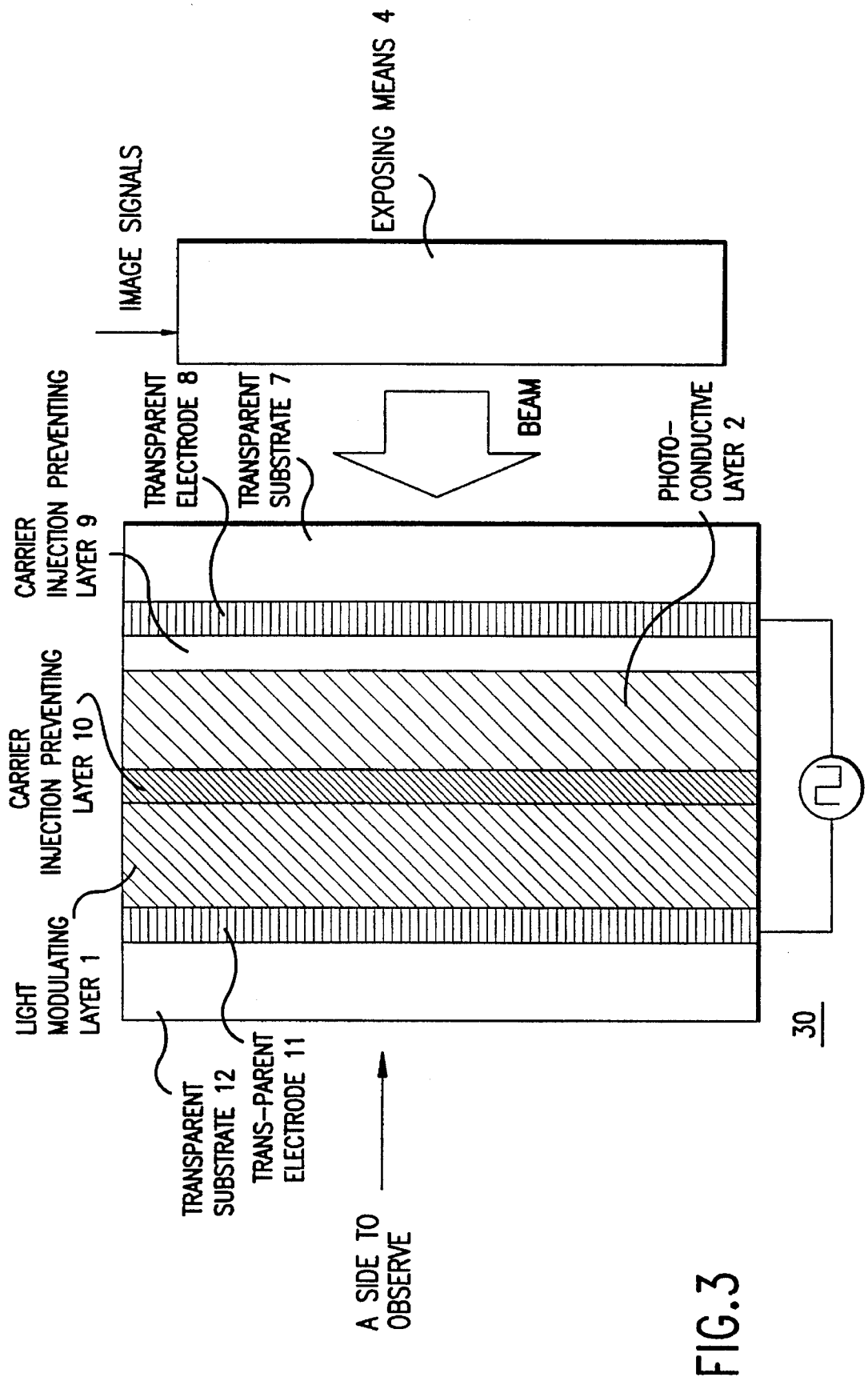
FIG. 3 is a cross-sectional view of the optically addressed liquid crystal displaying and recording medium used in a first embodiment of the present invention.

FIG. 3 is a cross-sectional view of a displaying and recording medium used for the optically addressed liquid crystal displaying and recording device to which the present invention is applied. A laminate, which comprises transparent electrode 8, carrier injection preventing layer 9, optical conductive layer 2 and carrier injection preventing layer 10, included in this displaying and recording medium 30 is made by the following processes:

forming transparent electrode 8 made of ITO (indium tin oxide) by sputtering on transparent substrate 7, which is one of the two transparent substrates of polyimide;

forming on the transparent substrate 7 TaOx to the thickness of 0.1 m as carrier injection preventing layer 9 for preventing the injection of carrier;

forming on carrier injection preventing layer 9 amorphous silicon hydride made of silicon hydride and hydrogen gas to a thickness of 5 m, as optical conductive layer 2, by plasma CVD method, doping a small amount of boron, applying a material wherein carbon blacks are dispersed in acrylic polymer to optical conductive layer 2 to a thickness of 1 m by a spinner as a layer which acts both as a carrier injection preventing layer and a light-shielding layer, photopolymerizing this material by exposure and firing it approximately at 473.15K; and thus made light-shielding layer 10 also acts as a light-absorbing layer to realize that it and the light modulating layer act as a white-black reflection display with which black characters are clearly seen in white background.

In order to make a mixed solution to be used for making light modulating layer 1, 80 percent by weight of cyanobiphenyl type smectic liquid crystal compound ("S2" available from BDH Ltd.), which is the material of liquid crystals, is mixed with a polymerized composition made of 0.4 percent by weight of 2-hydroxy-2-methyl-1-phenylpropane-1-one ("Darocure 1173", a registered trade mark of Merk Japan Ltd.) as a polymerization starting agent and a polymerized compound, which is made of 11.6 percent by weight of 1,6-hexanedioldiacrylate (KAYARAD HDDA available from NIPPON KAYAKU Co. Ltd.) and 8 percent by weight of urethaneacrylate oligomer ("Ebecryl 204" available from DAICEL UCB Company Ltd.) A small amount of spheric spacer having a diameter of 10 m ("Micropearl SP210" available from SEKISUI FINE CHEMICAL Co., Ltd.) is added to this mixture, and after mixing by an ultrasonic cleaner and deaerating, mixed solution is made. This mixed solution is held between substrate 7 on which layers such as the above described optical conductive layer 2 are laminated and another substrate 12 wherein ITO transparent electrode 11 is formed on PET film and ultraviolet ray having a wavelength of approximately 360 nm is applied to them uniformly from a black lamp light source for some seconds while keeping the whole medium at 298.15K, by which they are hardened. Thus, displaying and recording medium 30 is made.

Figure 4:
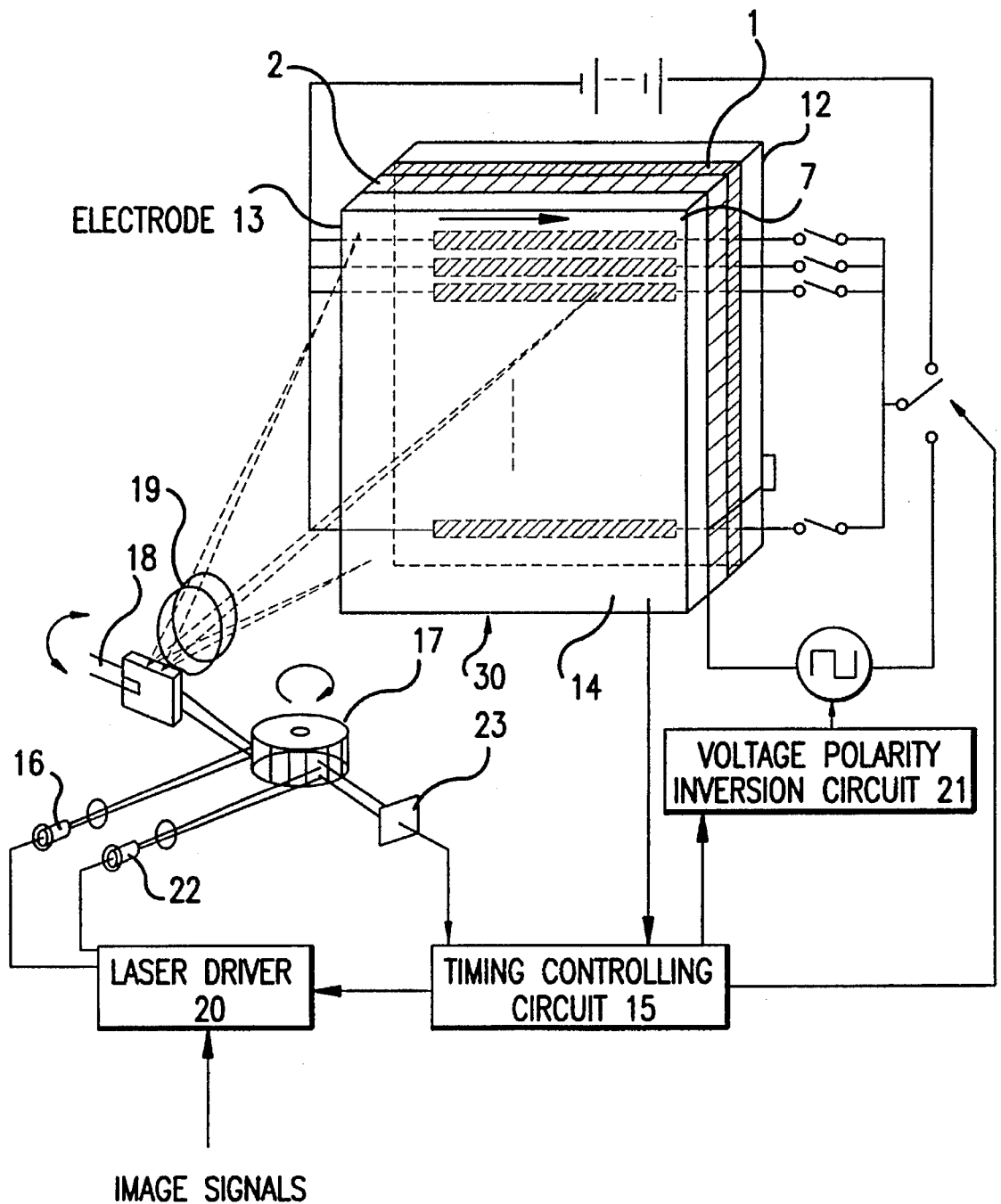
FIG. 4 is a schematic view showing the whole structure of the optically addressed liquid crystal displaying and recording device used in the first embodiment of the present invention.

FIG. 4 is a schematic view of the whole structure of the optically addressed liquid crystal displaying and recording device used in the first embodiment according to the present invention wherein thus made displaying and recording medium 30 is used. On the PET film, which is substrate 12 provided in the furthest side of the displaying and recording medium 30 shown in FIG. 4, is provided electrode 13 made of a plurality of electrodes, which has a width of 200 m, is in the form of a plurality of strips and each of which are separated with a spacing of 230 m therebetween and the light modulating layer 1 is heated by allowing DC pulse for heating to flow to electrode 13, by which the phase of the light modulating layer is controlled. Here, in the figure, sensor 14 for detecting the phase of the liquid crystals is provided in the background (non-image) portion which is shown in the lower right of the displaying and recording medium 30 and to which electric field is not applied, and it comprises an emitting element and a photosensitive element, by which a liquid crystal cell made by sandwiching the light modulation layer between transparent substrates is held (As shown in FIG. 4, in sensor 14, there is only the light modulating layer between transparent substrates.) In Sensor 14, if the liquid crystals in the light modulating layer is once transferred into isotropic phase by heating, while the liquid crystals are in isotropic phase and are transparent, the photosensitive element usually receives light from the emitting element. If the liquid crystals are transferred from isotropic phase to nematic phase by natural cooling, as electric field is not applied to the area of liquid crystal cell held by sensor 14, the orientation of liquid crystals is disturbed, light is scattered, the light to the photosensitive element is shielded, and this change is regarded as a signal showing the phase change of light modulating layer 1. Timing controlling circuit 15 receives this signal, are determined start timing for forming optical images on the optical conductive layer by scanning exposure and start timing for outputting image information for optical addressing in accordance with this signal, and the start timing for outputting image information is a trigger for applying electric field. Exposure to optical conductive layer 2 is carried out by receiving by a laser driver image signals inputted from outside, collimating by the drive of laser driver 20 the beam emitted from semiconductor laser 16 having a wavelength of 690 nm with the timing determined by timing controlling circuit 15, deflecting the collimated beam two-dimensionally by polygon mirror 17 and galvanomirror 18 and converging the deflected beam by f focusing optical system 19. Heating means for light modulating layer 1, structures and operations of phase transition sensor 14 or the like are described in detail in Japanese patent application No. Hei 5-55568 invented by the present inventors.

Figure 5:
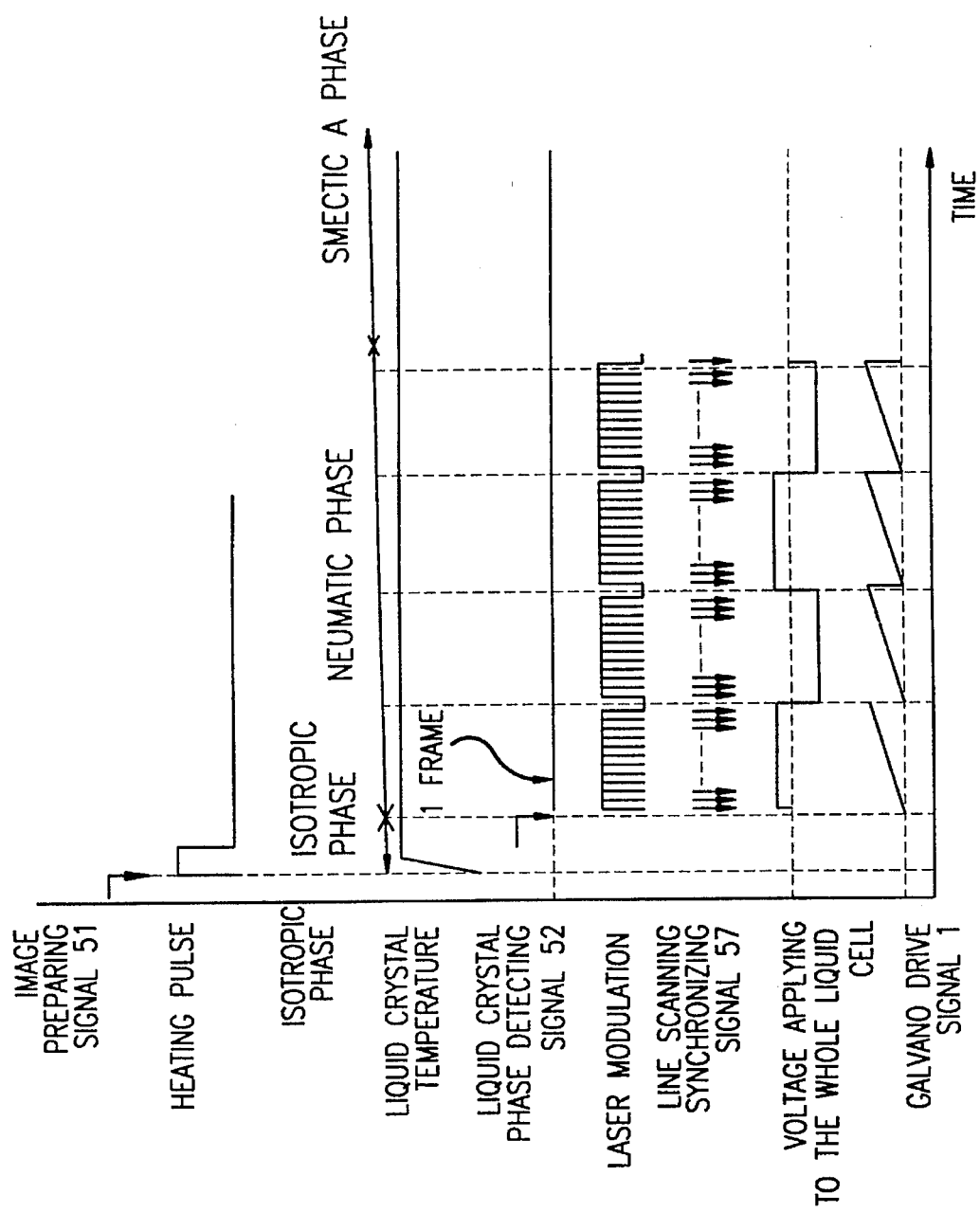
FIG. 5 is a timing chart of synchronous driving seen in the optically addressed liquid crystal displaying and recording deice shown in FIG. 4.

A specific method for controlling synchronously the timing of heating displaying and recording medium 30, of applying voltage and of carrying out scanning exposure in accordance with image information, for the optically addressed displaying and recording device having the above described structure, is now described. FIG. 5 shows the timing chart of driving for writing images. In accordance with image information, immediately before optical writing of images in the liquid crystal cell is carried out, image preparing signal S1 informing it is transmitted from the timing controlling circuit shown in FIG. 4. When signal S1 is received, DC pulse having a width of approximately 10 ms is allowed to flow from an external power supply to heating electrode 13, which acts as heating means. After being transferred into isotropic phase by Joule heat caused by heating current pulse, the liquid crystals are transferred into nematic phase. When the timing controlling means detects from an output of phase transition sensor 14 that the liquid crystals are transferred from isotropic phase into nematic phase and detecting signal S2 is received, exposure to optical conductive layer 2 is started. Line scanning synchronizing signal 3 detecting exposure period is then outputted as described later, and corresponding to this line scanning synchronizing signal S3, modulation of laser 16 and drive of galvanoscanner 18 in accordance with image information are carried out.

As described above, the beam from semiconductor laser 16 is scanned by polygonal scanner 17 in one-dimensional direction and it is incident on galvanoscanner 18. Here, besides semiconductor laser 16 whose on/off control is carried out in accordance with image information, in order to detect the line scanning period of polygonal scanner 17, the beam from another semiconductor laser 22 is made to be incident on polygonal scanner 17, and the reflection light is received by optical scanner 23, and an optical sensor outputs electric pulse line scanning synchronizing signal S3. This line scanning synchronizing signal S3 is inputted to timing controlling circuit 15, and further, if image information outputting starting signal is inputted to the laser driver, on/off control of semiconductor laser 16 is carried out in accordance with image information, being synchronized with this line scanning synchronizing signal S3. Meanwhile, galvanoscanner 18 rotates the reflection surface in a direction by a predetermined angle, being synchronized with this line scanning synchronizing signal S3, the galvanoscanner 18 returns the reflection surface to the initial position after images for a sheet of paper are outputted, and this operation is carried out continuously. At the same time, sufficient amount of AC voltage having rectangular waveform to make liquid crystals oriented (in this embodiment, 30 $V_{RMS}$) is applied to displaying and recording medium 30, and its polarity is inverted by voltage polarity inversion circuit 21 immediately after writing of images for a sheet of paper is completed and before writing of images of another sheet of paper is started. Here, the inversion of polarity is synchronized with line scanning synchronizing signal S3 for each line scanning, and it may be done while scanning portions other than images. It is, however, necessary here that the voltage polarity for the first line scanning is memorized in a memory connected with voltage polarity inversion circuit 21 and that the polarity is inverted for the next writing referring to the memorized polarity.

As described above, heating displaying and recording medium 30, two-dimensional laser exposure to optical conductive layer 2 and voltage applying to displaying and recording medium 30 are synchronously controlled, and continuous optical writing of images is carried out.

The timing of exposure and voltage applying is predetermined to be finished with a time margin before the liquid crystals are transferred from nematic phase into smectic phase. If rewriting of images is carried out periodically, the above described operation of optically image writing is carried out continuously, and if no rewriting of images is necessary, as the liquid crystals remain in smectic A phase wherein liquid crystals have memory characteristics at ambient temperature, the last images written before the liquid crystals are transferred into smectic A phase are kept held without a power supply.

As is clear from the description above, with the optically addressed liquid crystal displaying and recording device according to the present invention, as the polarity of voltage applied to each pixel of the laminate of the optical conductive layer and the light modulating layer is controlled to be the opposite with respect to that of the voltage applied to the same pixel the time immediately before or immediately after the time in question, deterioration of liquid crystals, which is caused by that voltage of the same polarity is continuously applied to each pixel and DC component is applied to the liquid crystals in the light modulating layer, is prevented.

Further, by making the waveform of the applied voltage rectangular, the same effective values of voltage are obtained regardless of the portion of the laminate of the optical conductive layer and the light modulating layer, and reflection images free of non-uniformity of density and having high contrast can be obtained.

By using a combination of a laser beam source and a scanning device capable of scanning the beam at least in a direction as exposing means, optically writing of images is realized with a system made at comparatively low cost and resolution of images can be varied easily.

Moreover, by carrying out inversion of the polarity of applied voltage in a portion other than images, of the portions to which scanning exposure is applied, inversion of the polarity of applied voltage does not occur in the portions of images, and bad influence on images, which is caused by the instantaneous unstableness of the applied voltage when inverted, can be prevented.

Further, by using a layer made of high polymer having liquid crystals dispersed therein as a light modulating layer, a flexible display having good reflection contrast can be obtained, and by using liquid crystals dispersed in high polymer of light modulating layer and which are in smectic A phase at ambient temperature and are transferred into nematic phase when the temperature is higher than ambient temperature, as the contents of the display can be held without a power supply, a screen can be detached (removed) and treated easily as a paper. Further, by comprising heating means for heating the light modulating layer to a plurality of levels which are higher than ambient temperature, writing of images can be carried out when the liquid crystals in the light modulating layer are transferred into nematic phase, drive voltage for optically addressing can be reduced. Yet further, if heating means whose heating timing is determined by liquid crystal phase detecting means for detecting the phases of the liquid crystals is used, images can be written with accurate timing and positively.

By using amorphous silicon hydride as a optical conductive layer, high speed image displaying can be carried out.

Embodiment 2

Figure 6:
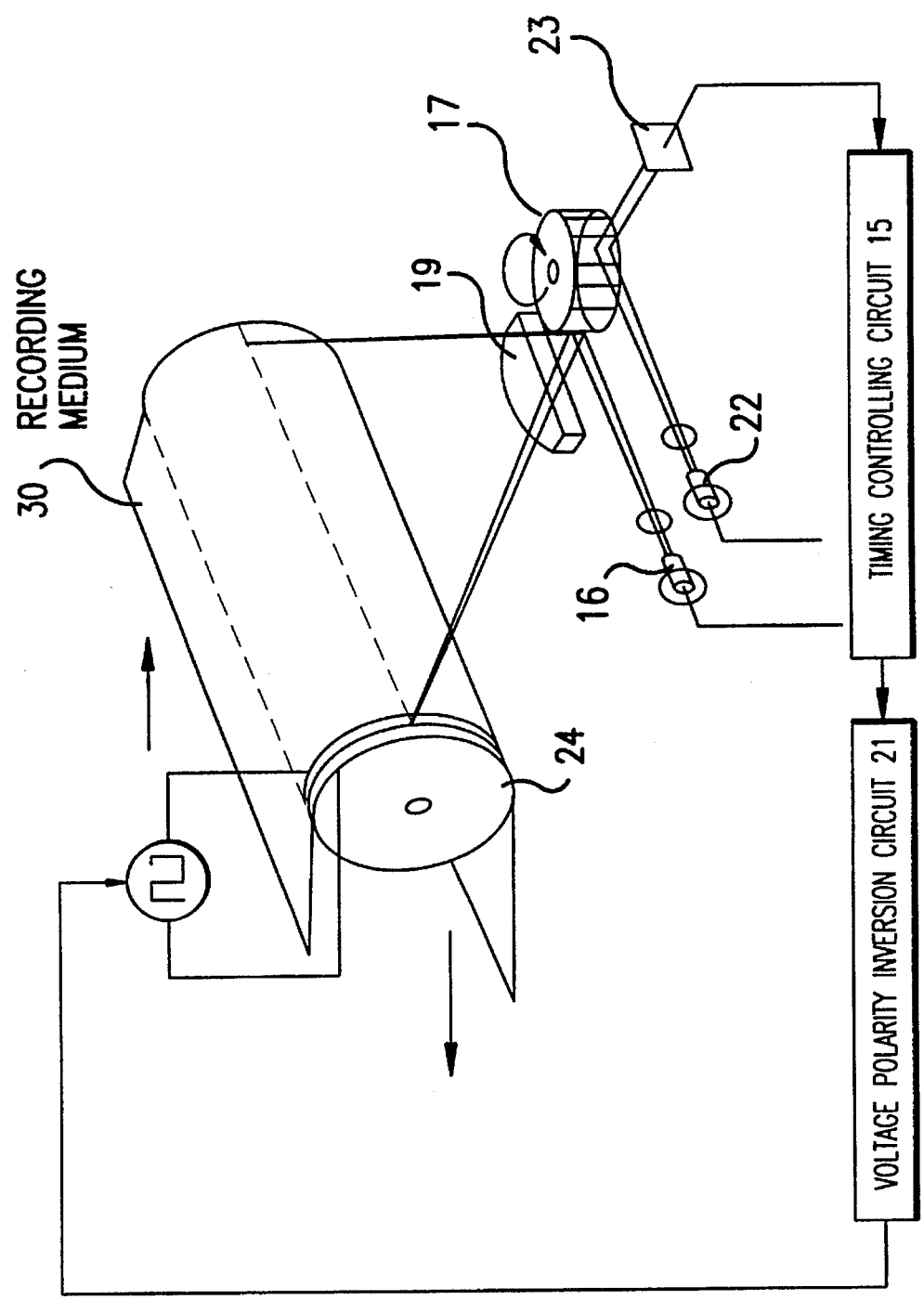
FIG. 6 is a schematic view showing the structure of a second embodiment according to the present invention.

The second embodiment according to the present invention is now described, referring to FIG. 6. In the first embodiment, the whole structure of which is shown in FIG. 4, the present invention is applied to an electronic display device with which display images being written can be seen. The range to which the present invention is applied is not restricted to such a device, and it can be applied to rewritable recording printers wherein a recording medium 30 in the form of a film as shown in FIG. 3 is wound around cylindrical drum 24 as shown in FIG. 6, and after repeating one-dimensional laser scanning a plurality of times with respect to the same line to be scanned, two-dimensional image writing in recording medium 30 is carried out, by rotating drum 24 little by little, and the written images are stored and can be treated as hard copies. Here, the polarity of AC voltage applied to displaying and recording medium 30 is inverted while scanning with respect to portions other than images is carried out, being synchronized with line scanning synchronizing signal S3 transmitted from optical sensor 23 for each line scanning.

The optically addressed liquid crystal displaying and recording device according to the present invention has been described so far referring to the embodiments, and the present invention is not restricted to these embodiments and various modification is possible.

What is claimed is:

1. An optically addressed liquid crystal displaying and recording device, comprising:

a displaying and recording medium having a light modulating layer including a liquid crystal and a photoconductive layer provided on one side of said light modulating layer, said light modulating layer is a layer including a high polymer resin having liquid crystal dispersed therein, said liquid crystal is in smectic A phase at ambient temperature and is transferred into nematic phase when the temperature is higher than the ambient temperature;

voltage applying means for applying a voltage of a predetermined polarity to said light modulating layer and said photoconductive layer of said displaying and recording medium;

voltage controlling means for controlling the polarity of the voltage applied by said voltage applying means;

exposing means for scanning a beam on said photoconductive layer;

detecting means for detecting scanning of the beam and for outputting a signal indicating the detection thereof; and controlling means for controlling a timing of the voltage applied by said voltage applying means based on said signal output from said detecting means, said voltage controlling means controlling said voltage applying means so that when said exposing means scans the beam on a predetermined portion of said displaying and recording medium, the polarity of the voltage applied by said voltage applying means becomes opposite with respect to that of the voltage applied by said voltage applying means during previous scanning.

2. The optically addressed liquid crystal displaying and recording device described in claim 1, wherein a waveform of the voltage applied by said voltage applying means is rectangular.

3. The optically addressed liquid crystal displaying and recording device described in claim 1, wherein said exposing means comprises a laser beam source for generating the beam and a scanning device capable of scanning the beam in at least one direction.

4. The optically addressed liquid crystal displaying and recording device described in claim 1, wherein inversion of the polarity of applied voltage is carried out in a portion other than an image area of a region on which the beam is scanned.

5. The optically addressed liquid crystal displaying and recording device described in claim 1, wherein said photoconductive layer comprises amorphous silicon hydride.

6. The optically addressed liquid crystal displaying and recording device described in claim 1, further comprising heating means for heating said light modulating layer to a plurality of levels which are higher than the ambient temperature.

7. The optically addressed liquid crystal displaying and recording device described in claim 6, further comprising liquid crystal phase detecting means for detecting a phase of said liquid crystal and wherein a heating timing of said heating means is determined by said liquid crystal phase detecting means.

* * * * *